United States Patent [19]

Leclercq

[11] Patent Number: 4,659,538
[45] Date of Patent: Apr. 21, 1987

[54] APPARATUS FOR LIMITING THE EFFECT OF AXIAL HYDRAULIC FLOW FORCE EXERTED ON FUEL ASSEMBLIES OF WATER-COOLED NUCLEAR REACTORS

[75] Inventor: Joseph M. Leclercq, Saint Didier, France

[73] Assignee: Commissariat a l'Energie Atomique, Paris, France

[21] Appl. No.: 568,694

[22] Filed: Jan. 6, 1984

Related U.S. Application Data

[63] Continuation-in-part of Ser. No. 488,006, May 2, 1983, abandoned, which is a continuation of Ser. No. 242,297, Mar. 10, 1981, abandoned.

[30] Foreign Application Priority Data

Mar. 26, 1980 [FR] France ............................ 80 06694

[51] Int. Cl.⁴ ............................................. G21C 3/12
[52] U.S. Cl. ................................. 376/364; 376/234; 376/285; 188/271; 188/297
[58] Field of Search ............... 376/364, 365, 285, 225, 376/234; 188/271, 287, 297, 286

[56] References Cited

U.S. PATENT DOCUMENTS

| | | | |
|---|---|---|---|
| 2,783,859 | 3/1957 | Patriquin | 188/287 |
| 3,584,331 | 6/1971 | D'Hooge | 188/287 |
| 3,853,703 | 10/1974 | Anthony et al. | 376/364 |
| 3,856,285 | 12/1974 | Yamada | 188/271 |
| 4,057,129 | 11/1977 | Hennells | 188/287 |
| 4,127,445 | 11/1978 | Anthony . | |
| 4,134,790 | 1/1979 | Bevilocqua et al. . | |
| 4,208,249 | 6/1980 | Jabsen | 376/364 |

FOREIGN PATENT DOCUMENTS

| | | | |
|---|---|---|---|
| 1296086 | 3/1962 | France | 376/307 |
| 1506453 | 11/1967 | France | 376/285 |
| 2148549 | 3/1973 | France . | |
| 960268 | 6/1964 | United Kingdom | 188/271 |
| 1025939 | 4/1966 | United Kingdom . | |
| 0709873 | 1/1980 | U.S.S.R. | 188/271 |

Primary Examiner—Harvey E. Behrend
Attorney, Agent, or Firm—Kerkam, Stowell, Kondracki & Clarke

[57] ABSTRACT

Apparatus for limiting the effect of axial hydraulic flow force exerted on the fuel assemblies by the hydraulic pressure of a coolant in a water-cooled nuclear reactor comprises slit cylindrical elastic sleeves positioned within recesses in cylindrical housings carried by the fuel assemblies, the sleeves receiving centering pins connected to upper and lower core plates of the reactor and exerting frictional force thereon so as to control the axial movements of the fuel assemblies during transient variations in hydraulic flow force.

7 Claims, 3 Drawing Figures

APPARATUS FOR LIMITING THE EFFECT OF AXIAL HYDRAULIC FLOW FORCE EXERTED ON FUEL ASSEMBLIES OF WATER-COOLED NUCLEAR REACTORS

This application is a continuation-in-part of prior application Ser. No. 488,006, filed May 2, 1983, now abandoned which is a continuation of prior application Ser. No. 242,297, filed Mar. 10, 1981, now abandoned.

The invention relates to fuel assemblies for nuclear reactors and more particularly to fuel assemblies for light water-cooled reactors.

Reference can usefully be made for the description of fuel assemblies for light water reactors of a known type to U.S. Pat. Nos. 4,061,536 and 3,791,466 in the name of the Westinghouse Electric Corporation. In the case of the said two patents, the nuclear fuel of the reactor is distributed over a plurality of fuel rods located in the reactor core in the form of contiguous assemblies with a generally square cross-section.

Each fuel assembly comprises a rigid mechanical frame constituted by an upper and a lower end member, provided with orifices to permit the passage of the cooling water circulating from bottom to top and a certain number of guide tubes ensure the stability and strength of the equipment through being fixed to said end members. Along each assembly, there is a certain number of supporting grids connected to the guide tubes and defining cells having a square cross-section. They permit the passage and transverse holding of the fuel rods, which are so to speak suspended by friction in the grids without contact with the upper and lower end members.

Each fuel assembly extends over a length of several meters between a lower core plate and an upper core plate belonging to the internal equipment of the reactor vessel. It rests on the lower core plate and is in effect threaded onto centering pins forming an integral part of the two aforementioned plates linked with the reactor vessel. The centering pins can penetrate to a greater or lesser extent into hollow cylindrical recesses, two or four of which are generally provided on each of the said upper and lower end members of each assembly. The upward vertical movement of each assembly between the two aforementioned core plates under the action of hydraulic pressure variations due to changes under normal operating conditions of the cooling water flow circulating from bottom to top in the reactor core, is prevented by the in general four springs which are located on the upper end member of the fuel assembly. FIG. 1 of U.S. Pat. No. 4,061,536 shows such a spring and it is given reference numeral 38 therein. However, these springs are compressed against the upper plate of the equipment within the reactor core during a "take-off" of the assembly as a result of incidental or accidental transient behaviour of the coolant flow. More specifically, the hydraulic flow forces are at different levels as a function of the reactor operating conditions. Under normal operating conditions, the fluctuations of the hydraulic flow lead to variations in the loads on the assemblies below approximately 10% of their weight. However, under incidental or accidental conditions of a transient nature, powerful, fast impulses are applied to the assembly. For example, these impulses can reach or even exceed the weight of an assembly, which therefore risks coming into contact with a harmful mechanical impact first with the upper core plate and after the impulse suppression with the lower core plate.

Although the devices of the aforementioned type can operate relatively satisfactorily, there is no doubt that metal springs do not form an ideal solution for damping or absorbing the vertical displacements of such fuel assemblies, because springs make restitution of the energy accumulated during their compression under rapid and important transients of the coolant hydraulic pressure. Moreover, the mechanical properties of these springs often deteriorate to a serious degree as a function of time, bearing in mind that they operate under high temperatures of approximately 300° C. and under intense radiation.

Moreover, construction of such metal springs require them to be overdimensioned so that they can absorb the large relative dimensional variations of the assemblies with respect to the equipment within the vessel under the effect of temperature and irradiation changes. Due to their overdimensioning, these springs seriously stress the internal equipment under certain operating conditions.

BRIEF SUMMARY OF THE INVENTION

The present invention relates to an apparatus for limiting the effects of axial hydraulic flow force on the fuel assemblies of light water nuclear reactors making it possible, by eliminating the metal springs, to obtain by simple, effective and easily realised means freedom from axial movements of the assembly, thus preventing severe mechanical shocks and impacts with the core plates.

The invention therefore relates to an apparatus for limiting the effect of axial hydraulic flow force exerted on the fuel assemblies by the hydraulic pressure of the coolant of a water-cooled nuclear reactor, of the type secured, with a certain axial displacement, by means of centering pins fixed onto the upper and lower core plates of internal equipment and sliding in corresponding hollow cylindrical housings or recesses carried by the said assemblies, wherein said housings or recesses are internally provided with a slit cylindrical elastic sleeve positioned against the inner wall of the corresponding housing, so as to grip the centering pin and exert thereon an adequate frictional force to prevent axial movements of the assembly during normal fluctuations in the hydraulic pressure.

According to the invention, the displacement-opposing means have a mixed construction, i.e. they comprise a mechanical axial braking obtained by friction producing a kinetic energy absorption completed by hydraulic damping. The axial displacement braking means are constituted by a calibrated slit cylindrical elastic sleeve.

According to a first embodiment of the invention, the housing of the elastic sleeve is perforated, in the vicinity of the end member of the fuel assembly, by a calibrated opening 19 controlling the removal of the water, thus producing a damping action during the penetration of the centering pin into the housing of the upper plate and a simultaneous extraction of the centering pin from the housing of the lower plate as a result of the fly-off of the fuel assemblies during rapid transient operating conditions.

According to a second embodiment of the invention, the opening permitting the controlled removal of the water is a calibrated slot 17 in the elastic sleeve and a wide opening 26 made in the housing which facilitates the free removal of the water contained in said housing. The means which are able to prevent the axial displacement are constituted by a calibrated slit cylindrical elastic sleeve positioned against the inner wall of the corresponding housing, so as to grip the centering pin and exert thereon an adequate frictional force to prevent axial movements of the assembly.

For all the cases, the slit in the cylindrical elastic sleeve can have a random shape. It can in particular extend along a generatrix of the cylindrical surface, can be given a helical configuration or can be in the form of a broken line on said surface.

BRIEF DESCRIPTION OF THE DRAWINGS

The invention is described in greater detail hereinafter relative to non-limitative embodiments and therefore with reference to the attached drawings, wherein.

DETAILED DESCRIPTION OF THE PREFERRED EMBODIMENTS

Figure 2:
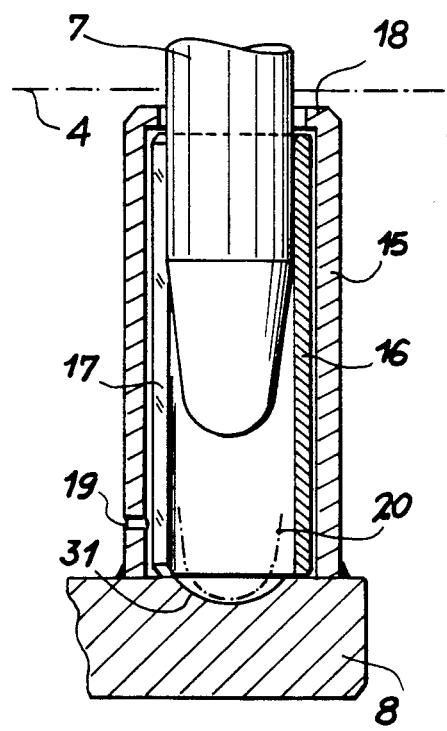
FIG. 2 shows diagrammatically and in section along the axis of a housing, a device for the mechanical braking and hydraulic damping of a centering pin by means of a slit sleeve and of a calibrated opening.
Figure 3:
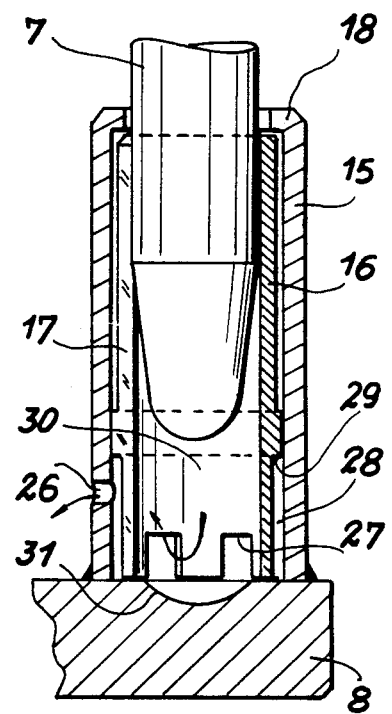
FIG. 3 shows in section along the axis of a housing, a device for braking and damping the centering pin using both a slit sleeve with a calibrated slot and a wide opening.

FIGS. 2 and 3 illustrate housings associated with the upper member of a not shown fuel assembly. However, it is obvious that the lower end members of the corresponding assemblies have identical, but downwardly directed means, which are of the same nature and function in a symmetrical manner. The following description and the claims for reasons of simplicity deal with the case where the said damping devices operate by the penetration of the centering pin and the removal of water, but it is obvious that this is not limitative and that the symmetrical operation by extracting the centering pins and the controlled inflow of water into the associated housings also forms part of the present invention.

Figure 1:
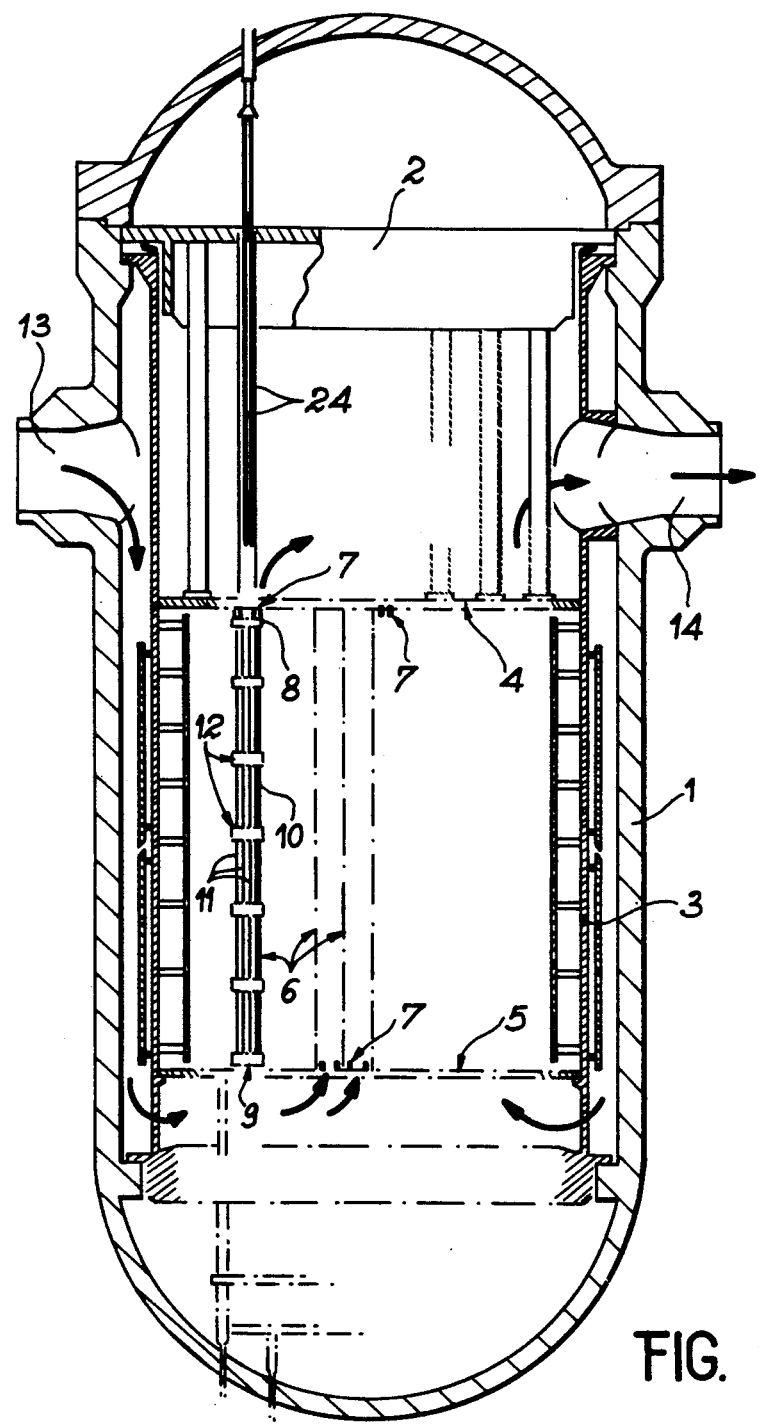
FIG. 1 shows the known components for fitting a fuel assembly into a light water reactor core.

FIG. 1 shows the general known arrangement of the fuel assemblies of a light water nuclear reactor, whose vessel is designated 1. The internal equipment is suspended within vessel 1. The internal equipment comprises upper and lower internal equipment. The upper internal equipment comprises an upper plate 2 and a lower plate 4, which are interconnected by spacers. The lower internal equipment comprise a core barrel 3 and a lower plate 5 connected by welding. Between the two plates 4 and 5 are placed the fuel assemblies, such as 6, which rest on plate 5 and are held between plates 4 and 5 with an axial clearance by means of a certain number of centering pins such as 7. The structure of a fuel assembly 6 comprises an upper end member 8 and a lower end member 9 and it is strengthened and spaced by guide tubes such as 10. The fuel rods 11 are held in place by supporting grids 12 defining cells with a square cross-section for the passage of the rods 11, the grids 12 being themselves connected to guide tubes 10. Guide tubes 10 are hollow and also receive the absorbing rods 24 used for checking the chain reaction and the rapid shut down of the reactor in the case of need.

The system described in FIG. 1 is immersed in pressurized hot water at a temperature close to 300° C. and which circulates in the core between an intake 13 and an outlet 14. Thus, the different assemblies 6 are immersed in an upward cooling stream able to bring about their "fly-off" between two plates 4 and 5, particularly during a sudden and transient change to the coolant flow conditions.

FIG. 2, which illustrates the first embodiment of the invention, shows the centering pin 7 connected to the not shown plate of upper internal equipment of a light water-cooled nuclear reactor. Reference numeral 8 designates the upper end member of a fuel assembly of such a reactor.

In existing constructions, the end member 8 has two housings or recesses 15, whereof only one is shown in FIG. 2. These housings 15 receive the corresponding centering pins 7, which axially slide within the same. Thus, they make it possible to hold in place the not shown fuel assembly, whilst permitting a certain axial movement of the latter to react against hydraulic flow force variations caused by variations in the upward flow conditions of the cooling water. This more or less pronounced penetration of centering pin 7 into housing 15 must take place with a significant braking action, e.g. approximately 2/10ths of the hydraulic fly-off force, in order to prevent axial movements of the fuel assemblies under normal operating conditions.

According to the invention, this is brought about in the case of FIG. 2 by a slit cylindrical sleeve 16 made from an elastic material possessing, as of Inconel, a dilatation coefficient less than the dilatation coefficient of the pin 7, as of Inconel, and having a lateral wide slot 17 over its entire height, following in this particular case a generatrix of the cylinder. This sleeve 16 is secured against the inner wall of housing 15 by means of upper widened portions 18 of housing 15. Moreover, in the inoperative state, its internal diameter is calibrated at a dimension less than the external diameter of the centering pin 7, which it frictionally grips during an axial penetration of pin 7. A calibrated opening 19 is provided in the lower part of housing 15 and facing slot 17 of sleeve 16 to permit the controlled removal of water in the case of an overpressure due to a rapid and important transient variation of the hydraulic flow force from the damping member constituted by housing 15.

Another solution illustrated on the FIG. 3 according to a second embodiment consists of calculating the size of the slot 17 of elastic sleeve 16 so that the latter forms the calibrated outflow means of the damping member, then formed by the volume contained in the lower part of sleeve 16. The aforementioned damping member is sealed by contact between sleeve 16 and pin 7.

In this embodiment, a ring shaped surface 29 limits a plenum 28. By large openings 27, the plenum 28 is in direct communication with the inside space 30 of the sleeve 16. According to the invention, the plenum 28 is always waterfull as the space 30 to permit the localization of pressure drop at the slot 17 of the sleeve 16. The slot 17 acts as a dash pot device during the penetration of the pin 7 into the space 30 resulting from an axial displacement of the fuel assembly following a rapid and important transient variation of the hydraulic flow force.

As shown, the evacuated water flow is distributed into parts. The more important part goes out by openings 27, 26 and plenum 28 without major damping effect and the other one by the calibrated slot 17 allowing the damping effect desired. The respective sizes of the slot 17, openings 26 and 27, and plenum 28 are chosen in such manner that the two parts subsist together during the penetration of pin 7 into the sleeve 16. The opening 26 in the housing is made sufficiently wide to permit the free removal of water.

The diameters of pin 7 and calibrated sleeve 16 are dimensioned in such a way that, as a function of the elasticity of the latter, the kinetic energy absorption due to radial frictional force developed by sleeve 16 on pin 7 is sufficient to prevent axial oscillations of the fuel assembly due to lack of stability of the cooling water outflow in any case. For example, it is sufficient for the frictional force to be approximately 2/10ths of the hydraulic pressure to ensure that movements of the fuel assembly are prevented. An impression 31 is provided on the upper surface of end member 8 of the assembly and this serves to house the point of the centering pin 7, which is rounded for this purpose and is represented in said extreme penetration position by dotted lines 20 in FIG. 2.

In the FIG. 3 the mechanical braking and hydraulic damping effects are also combined.

In all cases of a fly-off of the assembly, the damping members of the upper end member, are exposed to a water overpressure, whilst those of the lower end member are exposed to a water underpressure, these effects obviously being reversed during the downward movement of the assembly.

In all aforementioned cases, the slot 17 in the cylindrical elastic sleeve 16 can have a random configuration. Thus, it can extend along a generatrix of the cylindrical surface, can be helical or can be in the form of a broken line on said surface.

What is claimed is:

1. In a light water nuclear reactor having upper and lower core plates disposed within a pressure vessel, centering pins located on facing surfaces of the core plates, a plurality of fuel assemblies vertically disposed between the upper and lower core plates, the fuel assemblies being formed for limited axial movement between the plates, and upper and lower ends of the fuel assemblies having housings for receiving said centering pins, the pins penetrating axially into the housings, and an upward coolant water flow through said fuel assemblies which exerts an axial hydraulic flow force thereon, apparatus for limiting the effect of variations in said axial hydraulic flow force on said fuel assemblies comprising an elastic sleeve positioned within each housing of each fuel assembly for receiving a corresponding one of said centering pins, the sleeve comprising a cylindrical member having a slit in a wall thereof and a C-shaped cross section, and having an inner diameter which is less than the diameter of said corresponding penetrating pin so that the sleeve is expanded by the pin, the inner diameter being selected such that the sleeve grips and exerts on the pin because of the elasticity of the sleeve a predetermined frictional force, said frictional force being selected to prevent, during normal operation of the reactor, axial movement of the fuel assembly caused by variations in said axial hydraulic flow force which are less than said predetermined frictional force and to permit axial movement of the fuel assembly while exerting a braking action thereon during variations in axial hydraulic flow force which exceed said predetermined frictional force, and wherein each housing further includes hydraulic damping means for limitng axial movement of the fuel assembly during abnormal variations in said hydraulic flow force which exceed said predetermined frictional force.

2. An apparatus according to claim 1, wherein the elastic sleeve is formed of a material having a dilatation coefficient that is less than the dilatation coefficient of the centering pin.

3. An apparatus according to claim 1, wherein said predetermined frictional force is selected to be approximately 2/10ths of the axial hydraulic flow force.

4. An apparatus according to claim 1, wherein said hydraulic damping means comprises means for controlling the rate of removal of water from the housing during penetration of the centering pin.

5. An apparatus according to claim 4, wherein said housing is perforated by an opening sized to control the rate of removal of water from the housing, said opening comprising said controlling means.

6. An apparatus according to claim 5, wherein the slit in said sleeve is dimensioned to afford a water removal rate from the interior of the sleeve which is greater than the water removal rate afforded by said opening in the housing.

7. An apparatus according to claim 4, wherein the slit in said sleeve is dimensioned to afford a predetermined rate of removal of water from the interior of the sleeve, said slit comprising said controlling means, and wherein the housing is formed with an opening sized to afford a greater water removal rate than the water removal rate provided by said slit.

* * * * *